United States Patent [19]
Delbare et al.

[11] Patent Number: 5,253,310
[45] Date of Patent: Oct. 12, 1993

[54] OPTICAL COUPLING STRUCTURE AND METHOD

[75] Inventors: Wim J. R. Delbare, Gent-St. Amandsberg; Louis J. Vandam, Brasschaat; Jan A. O. Vandewege, Wondelgem, all of Belgium

[73] Assignee: Alcatel N.V., Amsterdam, Netherlands

[21] Appl. No.: 920,332

[22] Filed: Jul. 29, 1992

[30] Foreign Application Priority Data

Aug. 9, 1991 [BE] Belgium .............................. 9100733

[51] Int. Cl.$^5$ .......................... G02B 6/28; G02B 6/42; G02B 6/38; H05K 7/00
[52] U.S. Cl. ........................................ 385/14; 385/17; 385/21; 385/25; 385/52; 385/85
[58] Field of Search .................. 385/14, 17, 20, 21, 385/22, 23, 24, 25, 76, 89, 90, 50, 52, 85

[56] References Cited

U.S. PATENT DOCUMENTS

| | | | |
|---|---|---|---|
| 3,872,236 | 3/1975 | Swengel, Sr. et al. | 174/68.5 |
| 4,441,785 | 4/1984 | Petrozello | 385/25 |
| 4,723,827 | 2/1988 | Shaw et al. | 385/25 |
| 4,859,022 | 8/1989 | Opdahl et al. | 385/21 |

FOREIGN PATENT DOCUMENTS

| | | |
|---|---|---|
| 0497011 | 8/1992 | European Pat. Off. . |
| 2840824 | 9/1978 | Fed. Rep. of Germany . |
| 59-121008 | 7/1984 | Japan . |
| 2-234113 | 9/1990 | Japan .................. 385/17 |
| 2238398 | 5/1991 | United Kingdom . |

*Primary Examiner*—Frank Gonzalez
*Attorney, Agent, or Firm*—Spencer, Frank & Schneider

[57] ABSTRACT

A structure for optically coupling at least one optical conductor to an optical input or output of an optical device includes a carrier, having the optical conductor embedded therein such that the optical conductor has at least one locally bent portion reaching an outer surface of the carrier and forming there at least one optical contact point to which the optical input or output of the device may be coupled. Conductor positioning structure is provided disposed in the carrier, for accurately positioning the conductor in the carrier. Cooperating positioning structure, disposed on the carrier at the surface reached by the bent portion of the conductor, co-operates with corresponding complimentary positioning structure of the optical device.

15 Claims, 2 Drawing Sheets

OPTICAL COUPLING STRUCTURE AND METHOD

BACKGROUND OF THE INVENTION

1. Field of the Invention

The invention relates to a structure for optically coupling at least one optical conductor with an optical input or output of an optical device, the structure including a carrier wherein the optical conductor is embedded so that it has at least one locally bent part reaching an outer surface of the carrier and forming there at least one optical contact point to which the optical input or output of the device has to be coupled.

The above optical device may be either an active electro-optical component such as a light emitting diode, a laser diode, an optical switch, a detector etc or a group of such components or a passive component such as another optical conductor or ribbon-shaped optical cable, or an optical coupler, etc., or a group of such passive components. The optical conductor to be connected therewith may be an optical fiber, more particularly an optical fiber arranged on a circuit board on which the above device should be mounted or to which it should be connected.

2. Background Information

A structure of the above type is described in the European patent application No 91200170.8 (W. DELBARE-J. VANDEWEGE 2-2) in the name of the Applicant. In this patent application the carrier with embedded optical fibers and hence provided with optical contacts at its outer side, forms part of a circuit board. The optical input and/or output of the optical device to be mounted on the board should be very accurately positioned with respect to the optical contacts in order to realize an optical transmission of light through these contacts. For multimode applications, the positioning accuracy should preferably be 5 micrometers or better, while for monomode applications this accuracy should preferably be better than one micrometer.

In this known structure, this accuracy can only be obtained by active positioning, meaning that the optical device is activated and that this device and the carrier with the optical contact point are displaced with respect to each other until an optimal amount of optical power is transmitted through the optical contact. Depending on the type of optical device an outside light source or an outside light detector is thereby required. With some devices, such as an optical amplifier, both are necessary. This is also the case with passive optical devices, such as optical couplers or part of optical couplers. This active positioning is therefore complex and time consuming. Moreover, with optical devices having a plurality of inputs and outputs the active positioning does not provide good results if the distances between the optical fibers embedded in the carrier and therefore between the optical contact points, are not accurate.

SUMMARY OF THE INVENTION

An object of the invention is to remove these drawbacks and to provide an optical coupling structure of the above type allowing a passive alignment of the optical conductor in the carrier and the optical input or output of the optical device to be performed in a simple, rapid and nevertheless accurate way.

To this end the carrier is provided with conductor positioning means by which said conductor is accurately positioned in the carrier and said carrier is provided at the side reached by the bent portion of said conductor with positioning means intended to cooperate with complementary positioning means of the optical device.

In one particular embodiment of the invention, the carrier includes a substrate onto which the optical conductor is positioned and an embedding layer covering the conductor completely, except at the location of said optical contact point, and the optical means for positioning said optical conductor in the carrier is configured as a groove in the substrate, said groove being interrupted by a raised part over which the conductor located in the groove is bent.

In one practical embodiment of the invention, the positioning means on the carrier include one of the parts of at least one protrusion-recess connection.

Preferably the carrier at least has two recesses, one at each side of the optical conductor.

In a practical embodiment the optical conductor connected to the optical device is itself mounted on an optical device, more particularly a circuit board, and said carrier constitutes a coupling member mounted on said device or circuit board.

Obviously the input or output of the optical device which has to be coupled with the optical conductor must be accurately positioned on this device. To ensure this, said optical device may, in an efficient embodiment of the invention, include a coupling member similar to the above carrier and wherein at least one optical conductor is accurately positioned.

In most cases the optical conductor is an optical fiber. More particularly, the structure can couple a plurality of optical fibers embedded in the carrier, and therefore a plurality of optical contact points, with a plurality of optical inputs or outputs of the optical device.

The invention more particularly also relates to the substrate of the coupling member of the structure according to one of the previous embodiments, the carrier being also constituted by such a coupling member containing a substrate and an embedding layer.

The invention also relates to a method for realizing an optically coupling structure according to one of the above embodiments.

This aspect of the invention thus relates to a method including the steps of arranging at least one optical conductor on a substrate and bending it over a raised part on said substrate, embedding said conductor in an embedding layer and finally removing at least a portion of said bent part of the conductor thereby forming an optical contact, characterized in that use is made of a substrate, the upper side of which is provided with positioning means for the conductor and with at least one groove located aside said positioning means, that said groove is filled with a removable filling means, that said embedding layer is applied only afterwards, that said embedding layer is again removed until said filled groove is freed and that finally said filling means is removed.

BRIEF DESCRIPTION OF THE DRAWINGS

Other particularities and advantages of the invention will appear from the following description of an optically coupling structure, of a substrate therefor and of a method for realizing such a structure according to the invention. This description is only given by way of example and does not limit the invention. The references relate to the accompanying drawings wherein.

DETAILED DESCRIPTION OF THE PREFERRED EMBODIMENTS

Figure 1:
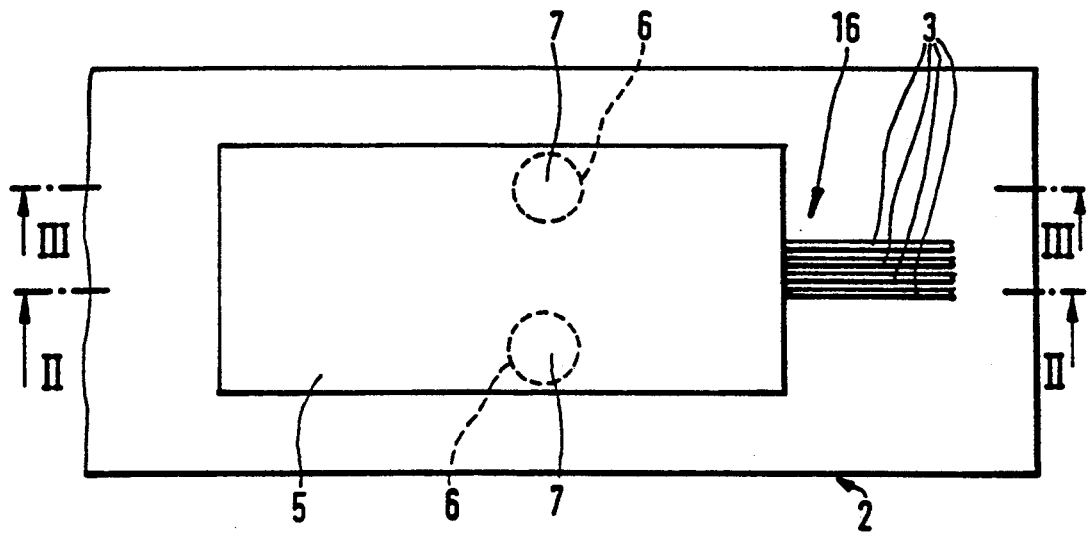
FIG. 1 represents a top view of an optical coupling structure according to the invention.
Figure 2:
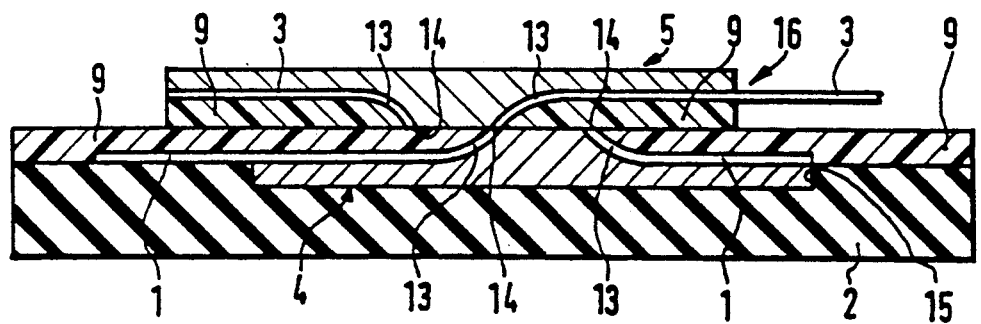
FIG. 2 represents a section according to line II—II of FIG. 1.
Figure 3:
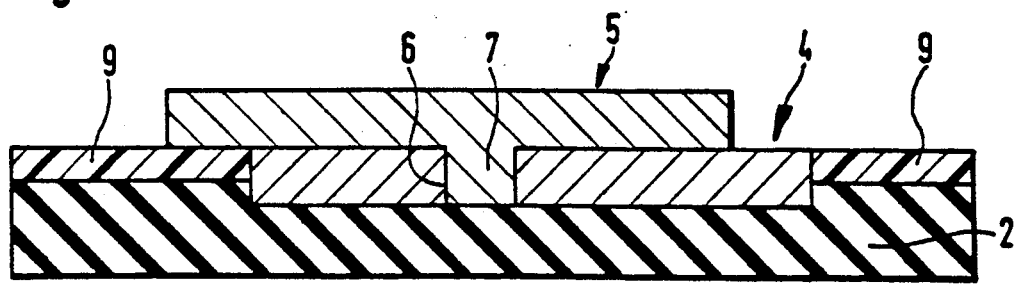
FIG. 3 represents a section according to line III—III of FIG. 1.

The optical coupling structure represented in FIGS. 1 to 3 couples a bundle of optical fibers 1 arranged on a circuit board 2 with an optical or an electro-optical device which, in the present case, is constituted by an optical cable 16 comprising a plurality of optical fibers 3.

This structure mainly comprises two coupling members 4 and 5 provided with co-operating positioning means. More particularly, the coupling member 4 presents two openings 6 while the coupling member 5 is provided with two taps 7 fitting in these openings. The coupling member 4 is mounted on the circuit board 2 and the coupling member 5 is mounted at the end of the cable 16.

Figure 5:
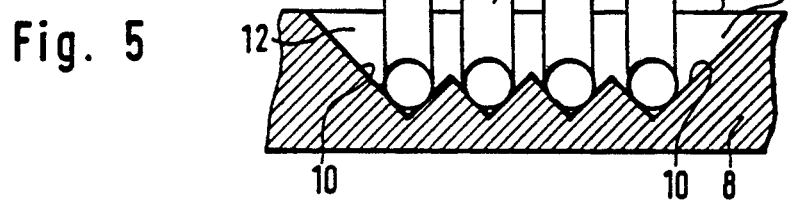
FIG. 5 represents a section according to line V—V of FIG. 4, but with optical fibers.
Figure 6:
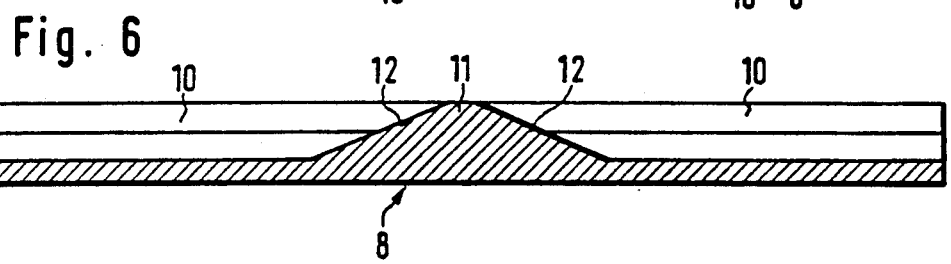
FIG. 6 represents a section according to line VI—VI of FIG. 4.
Figure 7:
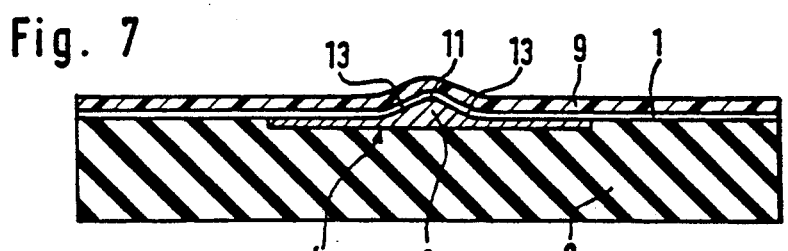
FIG. 7 represents a section of the coupling member of the structure of the FIGS. 1 to 3 during its realization, said coupling member being integrated in a circuit board.

Apart from the positioning means 6 and 7, both coupling members 4 and 5 have an identical structure. As may especially be derived from FIGS. 2 to 6, they contain a substrate 8 and applied on top thereof an embedding layer 9 in which the optical fibers 1 to 3 are embedded. The substrate 8 which is represented in detail in FIGS. 4 to 6, has parallel and adjacent V-shaped grooves 10, one for each fiber. However, in the middle of the coupling member these grooves are interrupted by a transverse raised part 11 with slanting sides 12 terminating in the grooves.

In each of the grooves 10 is positioned a fiber 1 or 3 which is bent over the raised part 11. The top of the bent part 13 of these fibers is removed partly or completely, so that one or two optical contact points 14 are formed on the upper side of the embedding layer 9. In the embodiments represented in FIGS. 1 to 3, and as is especially visible in FIG. 2 the top of the bent part 13 of the optical fibers is completely removed so that two optical contact points 14 are formed. To this end, the upper side of the raised part has been given the same height as the parts of the substrate 8 which are located at both sides of the grooves 10 and which constitute a stop for the removal of material.

The embedded layer 9 is also removed in front of the openings 6 in the substrate 8 of a coupling member 4 as a consequence of which these openings 6 terminate in the upper side of the coupling member. These openings are circular and located at both sides of the grooves 10. These openings 6 extend transversely through the substrate 8.

The taps 7 on the substrate 8 of a coupling member 5 protrude beyond the embedding layer 9 over a height such that when the coupling is made and the coupling member 5 with its embedding layer is put on the embedding layer of the coupling member 4, the two taps 7 completely fill the openings, as represented in FIGS. 1 to 3.

By the grooves 10, the fibers 1 and 3, and therefore also their contact points 14, are very accurately positioned in the coupling members 4 and 5, while by the openings 6 and the taps 7 these coupling members 4 and 5 are accurately positioned with respect to each other in the coupling structure. This means that the contact points 14 of the coupling member 4 are located accurately in front of the contact points 14 of the coupling member 5.

To prevent the optical fibers 1 from being bent when passing from the circuit board 2 to the coupling member 4 mounted thereon, the latter coupling member 4 is partly mounted in a cavity or recess 15 of the circuit board 2, such that the bottom side of the fibers 1 in the grooves 10 is located at the same height as the bottom side of these fibers on the circuit board 2, next to the coupling member 4. The embedding layer 9 on the coupling member 4, is integral with a cover layer also embedding the fibers 1 on the circuit board 2.

Figure 8:
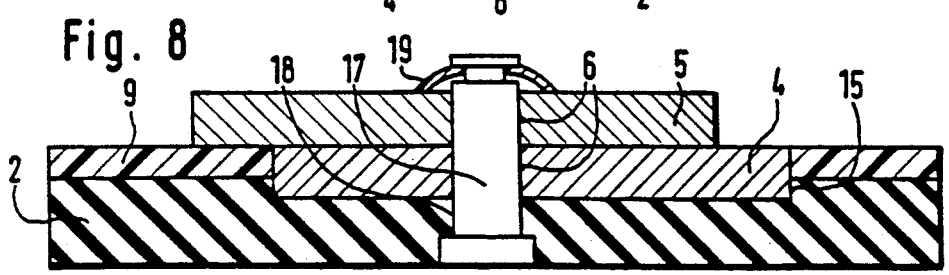
FIG. 8 represents a section of a structure similar to the one of FIG. 3, but relating to another embodiment.

The embodiment of the structure represented in FIG. 8 differs from the above described embodiment only in an alternative structure of the co-operating positioning means. Not only the coupling member 4, but also the coupling member 5 is provided with two openings 6, while the taps 7 are replaced by loose taps or pins 17 which extend transversely through the openings 6 in the coupling member 4 and through the oppositely located openings 6 in the coupling member 5. These pins 17 moreover extend through openings 18 in the circuit board 2. The openings 18 terminate in the cavity 15 at locations located exactly opposite the openings 6 of the coupling member 4 mounted in the cavity 15. At the bottom side of the circuit board 2 each of these openings 18 presents an enlargement wherein a widened end of a pin 17 fits. The pins 17 press the coupling members 4 and 5 against each other since a spring 19 is mounted on their other end.

The coupling structures described above are realized in the following way:

Before embedding the optical fibers 1 on the circuit board 2 the substrate 8 of the coupling member 4 having V-shaped grooves 10 and two openings 6, is mounted in the cavity 15 of the latter board 2.

This substrate 8 can be made of metal, such as copper or steel. In this case the grooves 10, the raised part 11 and the openings 6 or taps 7 are realized by pressing in a matrix or by spark erosion. However the substrate 8 can also be made of other materials, such as certain synthetic materials, silicon or ceramic material. Some synthetic materials can be injection moulded with great accuracy. Silicon can be accurately worked by means of etching techniques. Ceramic materials and more specifically alumina substrates with accurately realized V-grooves are commercialized by the Japanese Kyocera Corporation under the name of V-bloc VB 1-5. The substrate 8 can also be made of a plurality of materials. For instance, a ceramic layer with V-shaped grooves 10 and openings 6 may be provided with a coating of synthetic material. In any case the accuracy with which the grooves 10, the raised part 11, the openings 6 and possibly the taps 7 are made has to be large enough to obtain the required accurate positioning of the fibers 1 or 3 with respect to the substrate 8 as well as the required accurate location of the positioning means 6, 7 or 6, 17.

The openings 6 are then filled with a removable filling material. If the material used for the embedding layer 9 is an epoxy resin, then the commercially available product named Probimide 293 from Olin and Ciba Geigy (OCG) may be a suited filling material. Hardened at a temperature below 320 degrees Celsius, it may be removed chemically with the solvent QZ 3288 of OCG, without affecting the epoxy resin of the embedding layer 9.

In making the choice of the filling material and the solvent one has of course also to take into account that the material of the substrate 8 should not be affected.

In a following step, the fibers 1 are placed with their ends in the grooves 10 in such a way that they form bent parts 13 over the raised part 11. Thereby, the fibers 1 may temporarily be fixed in the grooves by means of a glue. To obtain a more accurate positioning of the fibers 1 in the grooves 10, it may be necessary to evacuate the superfluous amount of glue and to this end evacuation paths, such as cavities or grooves may be foreseen in the grooves 10. A layer of liquid epoxy resin is then poured on the substrate 8 and on the surrounding part of the circuit board, so that the optical fibers 1 are completely embedded, and this layer is hardened.

The thickness of the embedding layer 9 may be controlled by means of known techniques. If a relatively liquid epoxy resin mass was applied on the circuit board 2 and on the substrate 8, then this mass may be covered with a synthetic film, after which the unit comprising the circuit board 2 with the coupling member 4, the mass of epoxy resin and the synthetic film, is rolled. Hereby the embedding layer is brought to the required thickness, after which the synthetic film is removed and the epoxy resin is hardened.

Figure 4:
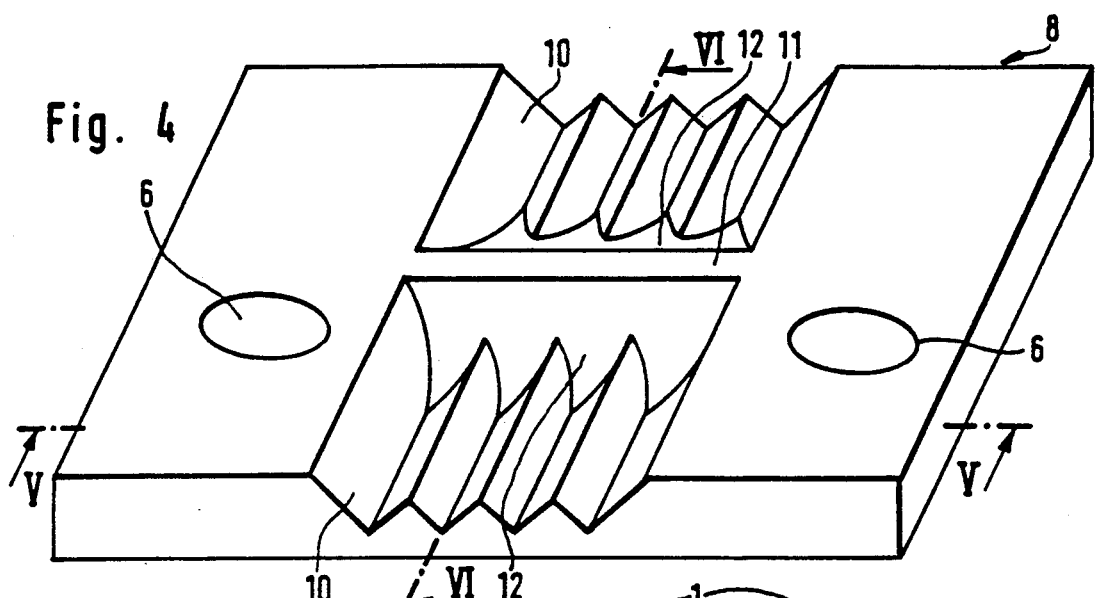
FIG. 4 is a perspective view of the substrate of the carrier in the structure of the previous figures.

In this way the coupling member 4 as represented in FIG. 4 is obtained. Preferably the thickness of the layer 9 is so chosen that the upper side thereof on top of the circuit board 2 and around the substrate 8 does not protrude beyond the upper side of the substrate 8.

Afterwards, the top of the bent part 13 of the fiber 1 and the epoxy resin covering this top are polished. The polishing is performed until the polishing tool makes contact with the upper side of the parts of the substrate 8 located on both sides of the grooves 8, these parts being thus used as polishing stopping members. If the substrate 8 is made of sufficiently hard material, then the speed with which the polishing tool penetrates into the material will diminish considerably as soon as this tool reaches the substrate 8. In this way an accurate control of the polishing depth is obtained. The height of the raised part 11 is so chosen that during the above described polishing operation, the required amount of material on top of the bent part 13 of the fibers is also removed.

By polishing away the top of the bent part 13 over a depth at least equal to the diameter of the optical fiber 1, this fiber is split in two parts and two optical contacts 14 are formed, as represented in FIG. 2. The fiber 1 ends in such optical contacts 14 and 100% of the light conveyed through the fiber 1 can be tapped or light can be injected into the fiber 1 at these contacts. In most cases only one of the two obtained optical contacts 14 will be used effectively. The embedding layer 9 above the openings 6 is also removed during the above mentioned polishing operation. The realization of the other optical contact 14 produced by the production process by leading the fiber 1 over the raised part 11, may possibly be avoided by breaking off the fiber 1 on the raised part 11. This would offer the advantage of space saving, while a smaller substrate 8 with grooves 10 on one side of the elevated part 11 would suffice.

Naturally the grooves 10 have to be sufficiently deep to ensure that after the polishing operation, the optical fibers 1 are either sufficiently covered or protected by the embedding layer 9.

Since the upper side of the substrate around the opening 6 serves as a polishing stop, the removal of the epoxy resin layer situated above the substrate 8, happens automatically during the polishing of the top of the bent part 13. After the polishing operation, the filling material of the opening 6 is dissolved so that these holes are freed. As a result of this polishing operation the coupling member 4 as represented in FIGS. 1 to 3 is obtained.

The coupling member 5 of the embodiment according to FIG. 8 is realized in a completely identical way. The coupling member 5 of the other embodiment, i.e. the coupling member 5 with taps 7, is also realized in an analogous way, however with the exception of the steps related to the openings 6 since in this embodiment the substrate of the coupling member has two taps 7 instead of openings. During the polishing operation of the tops of the bent parts 13 of the fibers 3, one has obviously to make sure that the taps 7 are not polished away but that all residual material of the embedding layer located around these taps 7 is indeed polished away.

The coupling member 5 with which the operational arrangement, i.e. the optical cable 16 with the fibers 3, is thus connected, is placed with its embedding layer 9 on the embedding layer 9 of the coupling member 4, as a result of which the alignment of the optical fibers 1 with the optical fibers 3 is automatically obtained, as already explained above.

In the embodiment of the structure represented in FIG. 8 the coupling member 5 is first so mounted on top of the coupling member 4 that the contact points 14 are substantially positioned in front of each other and that their openings 6 are located in front of each other. Thereafter, the pins 17 are inserted in the oppositely located openings 6 and an opening 18 of the circuit board located in front thereof. These pins 17 are fixed by means of the springs 19. After the pins 17 have been mounted one is also sure that the optical contact points 14 of the two coupling members 4 and 5 are positioned exactly opposite each other. Preferably care is taken that the optical contacts 14 of both coupling members 4 and 5 have symmetric shapes and are of equal size so that the contacts 14 of the two coupling members cover each other completely, as represented in FIG. 2. In the embodiment of FIG. 8 these optical contacts 14 are pressed against each other by the spring 19.

Because the surface of the optical contacts 14 is not planar and due to the limited compressibility of the material of which optical fibers 1 and 3 are made, it may happen that it is impossible to realize a physical contact over the whole surface of the optical contacts of the coupling members 4 and 5 placed on top of each other. In such case air gaps exist between the optical contacts 14. To limit light reflection at the junction of the optical fiber and the air gaps, these air gaps may be filled with a transparent material having a refraction index which approximates the one of the optical conductor. This material may be liquid, a gel or a solid, preferably a compressible material which can take the shape of the surface of the optical contacts.

In any case, it is desirable, when pressing the coupling means 4 and 5 against each other, that the contact pressure is mainly applied to the optical contacts 14 themselves. When finishing the optical contact points 14 care has consequently to be taken that the upper side of the embedding layer 9 and the upper side of the substrate 8 of the coupling members 9 do not present protrusions other than the possible taps 7 supporting the contact pressure instead of the optical contacts. When using a coupling member 5 provided with taps 7 it is therefore important to remove all residue material from the embedding layer 9 around the taps 7.

The above described structures allow a very quick and especially a very accurate coupling with an optical device of one or more conductors, more specifically of optical fibers 1 arranged on a circuit board 2.

The coupling members 4 and 5 allow a very easy realization of the structure in various applications, i.e. with different optical devices or optical conductors. The substrate 8 of these coupling means 4 and 5 allows the optical contact points 14 to be realized in an easy way by means of its raised part 11, possibly serves as a polishing stop, realizes the correct positioning of the embedded optical fibers 1 or 3, and by means of its openings 6 or taps 7 realizes a correct positioning with respect to the substrate 8 of a co-operating coupling means.

By removing by polishing a controlled and limited amount of material of the top of the bent part 13 of the optical fiber 1 or 3, only one instead of two optical contacts 14 can be made and a fraction of the light conveyed by the fiber can be collected from this contact. The remaining light is conveyed further by the uninterrupted fiber. Obviously light may also be injected in the fiber 1 or 3 via this optical contact.

The invention is by no means restricted to the above described embodiment, and within the scope of the patent application many changes may be made to the described embodiment, for instance with regard to the shape, the composition, the arrangement and the number of parts used for the realization of the invention.

More specifically, the carrier need not to be a separate coupling member as described above. If this is the case, then the coupling means should not necessarily be mounted on a circuit board. If the coupling means is mounted on such a board, then it need not necessarily be mounted in a cavity in this board. Instead of being a separate coupling means the carrier may for instance form part of an electro-optical device.

Obviously also the grooves 10 in the substrate need not be V-shaped. Other shapes are possible and the positioning means on the substrate should not necessarily be grooves.

When grooves are used they do not necessarily have to be interrupted by the raised part 11. As mentioned earlier they may end at the raised part, but they may also continue over the raised part and have a decreased depth at the location of the raised part. It is only necessary that the optical fibers positioned in the grooves are so bent that they have a top portion which may be completely or partly removed to form one or two optical contacts. It is clear that the optical conductor should not have a sharp bending. A small slope with respect to the lower part of the substrate may be sufficient.

While the principles of the invention have been described above in connection with specific apparatus, it is to be clearly understood that this description is made only by way of example and not as a limitation on the scope of the invention as defined in the claims.

We claim:

1. A structure for optically coupling at least one optical conductor to an optical input or output of an optical device, said structure comprising:
    a carrier, having the optical conductor embedded therein such that the optical conductor has at least one locally bent portion reaching an outer surface of the carrier and forming there at least one optical contact point to which the optical input or output of the device may be coupled;
    conductor positioning means, disposed in said carrier, for accurately positioning said conductor in the carrier; and
    cooperating positioning means, disposed on said carrier at the surface reached by the bent portion of said conductor, for co-operating with corresponding complimentary positioning means of the optical device;
    wherein said carrier includes a substrate onto which the optical conductor is arranged and an embedding layer covering the conductor completely except at the location of said optical contact; and
    wherein the conductor positioning means for positioning said optical conductor in the carrier comprises a groove in the substrate.

2. The structure according to claim 1, wherein the cooperating positioning means for co-operating with the complementary positioning means of the optical device is disposed in the substrate.

3. The structure according to claim 2, wherein the substrate comprises at least one groove for a conductor, and a raised part over which the conductor may be bent.

4. The structure according to claim 3, wherein said cooperating positioning means and the corresponding complementary positioning means include an opening at both sides of said groove.

5. The structure according to claim 1, wherein the cooperating positioning means on the carrier comprises a part of at least one protrusion recess connection.

6. The structure according to claim 5, wherein the carrier has at least two recesses, one at each side of the optical conductor.

7. The structure according to claim 5, wherein a protrusion is provided on the substrate as a raised part with a slope terminating in said groove.

8. The structure according to claim 7, wherein said substrate has portions located at both sides of said groove, an upper side of said portions being at least as high as an upper side of said raised part.

9. An optical coupling structure according to claim 1, manufactured by the method comprising the steps of:
    arranging at least one optical conductor on a substrate and bending it over a raised part on said substrate;
    embedding said conductor in an embedding layer and removing at least a portion of said bent part of the conductor thereby forming an optical contact;
    wherein said substrate, on an upper side thereof, is provided with conductor positioning means and at least one groove located beside said conductor positioning means, the method of manufacture further comprising:
    filling said groove with a removable filling means prior to the arranging step;

applying said embedding layer to accomplish the embedding step after said step of filling said groove;

removing said embedding layer until said filled groove is freed; and removing said filling means.

10. The optical coupling structure made by the method according to claim 9, wherein said substrate is provided with at least one conductor groove and said conductor is placed in said groove.

11. A structure for optically coupling at least one optical conductor to an optical input or output of an optical device, said structure comprising:

a carrier, having the optical conductor embedded therein such that the optical conductor has at least one locally bent portion reaching an outer surface of the carrier and forming there at least one optical contact point to which the optical input or output of the device may be coupled;

conductor positioning means, disposed in said carrier, for accurately positioning said conductor in the carrier; and cooperating positioning means, disposed on said carrier at the surface reached by the bent portion of said conductor, for co-operating with corresponding complimentary positioning means of the optical device;

wherein the optical conductor connected to the optical device is mounted on an optical device circuit board, and said carrier comprises a carrier coupling member mounted on said device circuit board.

12. The structure according to claim 11, wherein the optical device with which the conductor is to be connected, includes a coupling member which is similar to said carrier coupling member and whereby at least one optical conductor is accurately positioned.

13. The structure according to claim 12, wherein said cooperating positioning means and the corresponding complementary positioning means comprise at least one opening in one of the coupling members and a tap fitting.

14. The structure according to claim 12, wherein said cooperating positioning means and the corresponding complementary positioning means comprise at least one opening in each of said coupling members and a loose pin fitting in these openings.

15. The structure according to claim 14, wherein a plurality of optical conductors comprising optical fibers are embedded in the carrier, said plurality of optical conductors each having at least one optical contact point at an outer side of the carrier.

* * * * *